United States Patent
Beda, III et al.

(10) Patent No.: US 9,430,255 B1
(45) Date of Patent: Aug. 30, 2016

(54) UPDATING VIRTUAL MACHINE GENERATED METADATA TO A DISTRIBUTION SERVICE FOR SHARING AND BACKUP

(71) Applicant: Google Inc., Mountain View, CA (US)

(72) Inventors: Joseph S. Beda, III, Seattle, WA (US); Craig I. McLuckie, Sammamish, WA (US); Christopher L. Eck, Sammamish, WA (US)

(73) Assignee: Google Inc., Mountain View, CA (US)

(*) Notice: Subject to any disclaimer, the term of this patent is extended or adjusted under 35 U.S.C. 154(b) by 580 days.

(21) Appl. No.: 13/840,730

(22) Filed: Mar. 15, 2013

(51) Int. Cl.
*G06F 9/455* (2006.01)
*G06F 11/14* (2006.01)

(52) U.S. Cl.
CPC .............. *G06F 9/455* (2013.01); *G06F 11/14* (2013.01); *G06F 2009/4557* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 5,463,768 A | 10/1995 | Cudihy et al. | |
| 5,655,081 A | 8/1997 | Bonnell et al. | |
| 5,778,444 A | 7/1998 | Langan et al. | |
| 6,178,482 B1 | 1/2001 | Sollars | |
| 6,505,211 B1 | 1/2003 | Dessloch et al. | |
| 6,505,248 B1 | 1/2003 | Casper et al. | |
| 6,598,179 B1 | 7/2003 | Chirashnya et al. | |
| 6,643,613 B2 | 11/2003 | McGee et al. | |
| 6,898,697 B1 | 5/2005 | Gao et al. | |
| 6,996,502 B2 | 2/2006 | De La Cruz et al. | |
| 7,043,455 B1 | 5/2006 | Cuomo et al. | |
| 7,062,718 B2 | 6/2006 | Kodosky et al. | |
| 7,093,086 B1 * | 8/2006 | van Rietschote | 711/161 |
| 7,117,243 B2 | 10/2006 | Peart | |
| 7,478,388 B1 | 1/2009 | Chen et al. | |
| 7,500,262 B1 | 3/2009 | Sanin et al. | |
| 7,529,836 B1 | 5/2009 | Bolen et al. | |
| 7,596,620 B1 | 9/2009 | Colton et al. | |
| 7,650,331 B1 | 1/2010 | Dean et al. | |

(Continued)

FOREIGN PATENT DOCUMENTS

| | | |
|---|---|---|
| EP | 0915419 | 5/1999 |
| EP | 0909058 | 7/2010 |

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Benjamin Wu
(74) *Attorney, Agent, or Firm* — Fish & Richardson P.C.

(57) ABSTRACT

Methods, systems, and apparatus, including computer programs encoded on computer storage media, for maintaining virtual machine metadata. One of the methods includes initializing a first virtual machine (VM) on a first host machine using one or more elements of user-specified initialization metadata. Upon receiving a notification that the first VM has published one or more elements of VM-generated metadata, one or more elements of VM-generated metadata are obtained. A request is received for the one or more elements of VM-generated metadata, and the one or more elements of VM-generated metadata are provided in response to the request.

30 Claims, 4 Drawing Sheets

(56) References Cited

U.S. PATENT DOCUMENTS

| | | | |
|---|---|---|---|
| 7,653,833 B1 | 1/2010 | Miller et al. | |
| 7,761,573 B2 | 7/2010 | Travostino et al. | |
| 7,804,862 B1 | 9/2010 | Olson et al. | |
| 7,836,285 B2 | 11/2010 | Giri et al. | |
| 8,065,717 B2 | 11/2011 | Band | |
| 8,103,771 B2 | 1/2012 | Tanaka et al. | |
| 8,146,147 B2 | 3/2012 | Litvin et al. | |
| 8,151,263 B1* | 4/2012 | Venkitachalam | G06F 9/485 711/162 |
| 8,261,295 B1 | 9/2012 | Risbood et al. | |
| 8,266,576 B2* | 9/2012 | Lam | G06F 8/63 709/201 |
| 9,020,895 B1* | 4/2015 | Rajashekar | G06F 17/30088 707/639 |
| 2002/0091902 A1 | 7/2002 | Hirofuji | |
| 2004/0139368 A1 | 7/2004 | Austen et al. | |
| 2005/0010715 A1 | 1/2005 | Davies et al. | |
| 2005/0166011 A1 | 7/2005 | Burnett et al. | |
| 2006/0059228 A1 | 3/2006 | Kasamsetty et al. | |
| 2006/0161753 A1 | 7/2006 | Aschoff et al. | |
| 2007/0112956 A1 | 5/2007 | Chapman et al. | |
| 2007/0118694 A1 | 5/2007 | Watanabe et al. | |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2007/0288921 A1 | 12/2007 | King et al. | |
| 2008/0034364 A1* | 2/2008 | Lam | G06F 8/63 718/1 |
| 2008/0077648 A1* | 3/2008 | Lam | G06F 8/63 709/201 |
| 2008/0086515 A1 | 4/2008 | Bai et al. | |
| 2008/0205415 A1 | 8/2008 | Morales | |
| 2008/0215796 A1 | 9/2008 | Lam et al. | |
| 2008/0222246 A1 | 9/2008 | Ebling et al. | |
| 2008/0244471 A1 | 10/2008 | Killian et al. | |
| 2008/0270704 A1 | 10/2008 | He et al. | |
| 2009/0097657 A1 | 4/2009 | Scheidt et al. | |
| 2009/0150629 A1 | 6/2009 | Noguchi et al. | |
| 2009/0199177 A1 | 8/2009 | Edwards et al. | |
| 2009/0222815 A1 | 9/2009 | Dake | |
| 2009/0241108 A1 | 9/2009 | Edwards et al. | |
| 2009/0249440 A1 | 10/2009 | Platt et al. | |
| 2009/0276771 A1 | 11/2009 | Nickolov et al. | |
| 2009/0300605 A1 | 12/2009 | Edwards et al. | |
| 2009/0313447 A1* | 12/2009 | Nguyen | G06F 11/1451 711/162 |
| 2009/0328170 A1* | 12/2009 | Williams | G06F 21/41 726/7 |
| 2010/0017859 A1 | 1/2010 | Kelly | |
| 2010/0049929 A1* | 2/2010 | Nagarkar | G06F 9/45533 711/162 |
| 2010/0057913 A1 | 3/2010 | DeHaan | |
| 2010/0071035 A1 | 3/2010 | Budko et al. | |
| 2010/0094999 A1 | 4/2010 | Rama et al. | |
| 2010/0095000 A1 | 4/2010 | Kettler et al. | |
| 2010/0199089 A1 | 8/2010 | Vysogorets et al. | |
| 2010/0212004 A1 | 8/2010 | Fu | |
| 2010/0287548 A1 | 11/2010 | Zhou et al. | |
| 2010/0325471 A1* | 12/2010 | Mishra | G06F 11/1438 714/3 |
| 2011/0022812 A1 | 1/2011 | van der Linden et al. | |
| 2011/0055361 A1 | 3/2011 | DeHaan | |
| 2011/0085563 A1 | 4/2011 | Kotha et al. | |
| 2011/0103389 A1 | 5/2011 | Kidambi et al. | |
| 2011/0113206 A1* | 5/2011 | Heim | G06F 9/4418 711/162 |
| 2011/0153838 A1 | 6/2011 | Belkine et al. | |
| 2011/0191485 A1 | 8/2011 | Umbehocker | |
| 2011/0225582 A1* | 9/2011 | Iikura et al. | 718/1 |
| 2011/0231280 A1 | 9/2011 | Farah | |
| 2011/0258441 A1 | 10/2011 | Ashok et al. | |
| 2012/0084262 A1* | 4/2012 | Dwarampudi | G06F 11/1448 707/667 |
| 2012/0122573 A1* | 5/2012 | Ha | H04L 67/1095 463/31 |
| 2012/0185688 A1 | 7/2012 | Thornton | |
| 2012/0191912 A1 | 7/2012 | Kadatch et al. | |
| 2012/0233282 A1 | 9/2012 | Voccio et al. | |
| 2012/0233611 A1 | 9/2012 | Voccio | |
| 2012/0233678 A1 | 9/2012 | Pal | |
| 2012/0233705 A1 | 9/2012 | Boysen et al. | |
| 2012/0324183 A1* | 12/2012 | Chiruvolu | G06F 11/2038 711/162 |
| 2013/0041872 A1 | 2/2013 | Aizman et al. | |
| 2013/0055252 A1 | 2/2013 | Lagar-Cavilla et al. | |
| 2013/0061226 A1 | 3/2013 | Ammons et al. | |
| 2013/0074065 A1* | 3/2013 | McNeeney | G06F 11/141 718/1 |
| 2013/0086585 A1 | 4/2013 | Huang et al. | |
| 2013/0167148 A1* | 6/2013 | Lee | G06F 9/45558 718/1 |
| 2014/0095816 A1* | 4/2014 | Hsu | G06F 3/0655 711/162 |
| 2014/0095817 A1* | 4/2014 | Hsu | G06F 11/1438 711/162 |
| 2014/0123136 A1* | 5/2014 | Beda, III | G06F 9/45558 718/1 |
| 2014/0149352 A1* | 5/2014 | Chan | G06F 9/455 707/639 |
| 2014/0149695 A1* | 5/2014 | Zaslaysky et al. | 711/162 |
| 2014/0149696 A1* | 5/2014 | Frenkel | G06F 9/45558 711/162 |
| 2014/0189685 A1* | 7/2014 | Kripalani | G06F 8/65 718/1 |
| 2014/0215461 A1* | 7/2014 | Laor | G06F 9/45533 718/1 |

FOREIGN PATENT DOCUMENTS

| | | |
|---|---|---|
| EP | 2406970 | 9/2012 |
| WO | WO 2010/085579 | 7/2010 |

OTHER PUBLICATIONS

Primet, Pascale, et al.., "HIPCAL: State of the Art of OS and Network virtualization solutions for Grids", Sep. 14, 2007, 38 pages.

Abdull, AlastairIrvine, et al. "Generic Routing Encapsulation", [online] [retrieved on Jan. 4, 2011]. Retrieved from the Internet: <URL: http:/ / creativecommons. org/ licenses/ by-sa/ 3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.

Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online], Dec. 12, 2010; [Retrieved on Jan. 20, 2011] Retrieved from the Internet <URL: http://en.wikipedia.org/wiki/OAuth>; 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

(56) References Cited

OTHER PUBLICATIONS

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Benincosa. "Ganglia and Nagios, Part 2: Monitor enterprise clusters with Nagios—Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 pages.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 pages.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution—Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution—Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How To: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managingaws-part-6-ssh-key-pairs>, 5 pages.
Live Migration of Virtual Machines, Clark et al., University of Cambridge Laboratory, Department of Computer Science; University of Copenhagen, Denmark, 2005; 14 pages.
Making Services Easy to Migrate, Debian Administration, System Administration Tips and Resources, Jan. 1, 2005, 5 pages.
L. Gommans, et al., Token-Based Authorization of Connection Oriented Network Resources, 1st International Workshop on Networks for Grid Applications (Grid Nets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.
Na, Lee Da, Authorized Officer for Korean Intellectual Property Office, International Search Report and Written Opinion for PCT/US2012/020954, International Search Report completed Aug. 23, 2012, 10 pages.
Alpern, B., "The Jalapeno virtual machine," IBM Systems Journal, 2000, vol. 39, Issue 1, pp. 211-238.
Cabellos et al., LISPmob: Mobile Networking through LISP, Apr. 2, 2012, 8 pages.
Amazon CloudWatch—Developer Guide—API Version Aug. 1, 201. Amazon Web Services LLC, 2010, 75 pages.

\* cited by examiner

400

```
┌─────────────────────────────────────┐
│ Initialize first VM on first host machine │─ 410
└─────────────────────────────────────┘
                  │
                  ▼
┌─────────────────────────────────────┐
│ Receive VM-generated metadata from first │─ 420
│                VM                   │
└─────────────────────────────────────┘
                  │
                  ▼
┌─────────────────────────────────────┐
│ Receive indication that the first VM has failed │─ 430
└─────────────────────────────────────┘
                  │
                  ▼
┌─────────────────────────────────────┐
│ Initialize second VM on second host machine │─ 440
└─────────────────────────────────────┘
                  │
                  ▼
┌─────────────────────────────────────┐
│ Configure second VM using VM-generated │─ 450
│ metadata obtained from metadata service │
└─────────────────────────────────────┘
```

UPDATING VIRTUAL MACHINE GENERATED METADATA TO A DISTRIBUTION SERVICE FOR SHARING AND BACKUP

BACKGROUND

This specification relates to cloud computing.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

A virtual machine can write metadata to a metadata service as it is running. The written metadata can be used to persist the state of the virtual machine when restarted on a different host machine.

In general, one innovative aspect of the subject matter described in this specification can be embodied in methods that include the actions of initializing a first virtual machine (VM) on a first host machine using one or more elements of user-specified initialization metadata; receiving a notification that the first VM has published one or more elements of VM-generated metadata; obtaining the one or more elements of VM-generated metadata; receiving a request for the one or more elements of VM-generated metadata; and providing the one or more elements of VM-generated metadata in response to the request. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving the request for the one or more elements of VM-generated metadata comprises receiving the request from a user-device external to a datacenter hosting the first VM. Receiving the request for the one or more elements of VM-generated metadata comprises receiving the request from a second VM hosted in a datacenter hosting the first VM. The actions include receiving an indication that the first VM has failed; initializing a second VM on a different second host machine; and configuring the second VM using the one or more elements of VM-generated metadata. The actions include overwriting one or more elements of the user-specified initialization metadata with one or more elements of VM-generated metadata from the first VM. The VM-generated metadata represents a state of the first VM. Initializing a second VM on a different second host machine comprises resuming the state of the first VM in the second VM. The VM-generated metadata comprises one or more attributes of an application running within the first VM. The actions include configuring a second VM using the one or more elements of VM-generated metadata including: starting an application on the second VM; and restoring a state of the application to a previous state using the one or more elements of VM-generated metadata. The first VM intermittently publishes one or more elements of VM-generated metadata to a metadata service.

In general, another innovative aspect of the subject matter described in this specification can be embodied in methods that include the actions of initializing a first virtual machine (VM) on a first host machine using user-specified metadata; receiving one or more elements of VM-generated metadata from the first VM; receiving an indication that the first VM has failed; initializing a second VM on a different second host machine; and configuring the second VM using the one or more elements of VM-generated metadata. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The user-specified metadata includes initialization metadata. After receiving the one or more elements of VM-generated metadata from the first, the method further comprises overwriting one or more elements of the initialization metadata with the one or more elements of VM-generated metadata. Initializing the second VM on the different second different host machine comprises initializing the second VM using the user-specified metadata. Initializing the second VM using the one or more retrieved elements of VM-generated metadata comprises restoring a state of the first VM. The actions include receiving VM-generated metadata defining the state of an application running within the first VM; starting the application on the second VM; and restoring a state of the application using the VM-generated metadata. The actions include intermittently providing one or more elements of metadata for the first VM to a metadata service.

Particular embodiments of the subject matter described in this specification can be implemented so as to realize one or more of the following advantages. Persisting VM metadata using a metadata service can provide of level of VM persistence without requiring the overhead of persistent disks. The lower storage space requirements for metadata allow for more frequent updates of VM state to the metadata service. Storing VM metadata in a writable metadata service provides for VMs and guest applications that expand beyond the lifetime of a single VM instance. Storing VM-generated metadata in a writable metadata service allows a current state of the VM to be stored and persisted outside of a particular host machine hosting the VM. This allows other entities inside or outside the system to obtain an up-to-date view of the state of the VM without querying the VM itself. In addition, VM's themselves can determine and communicate their own roles in a distributed system, allowing for the design of more dynamic systems. Storing the state of the VM in the metadata service also allows persistence of the VM and migration of the VM from one host machine to another.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow chart of an example process for restarting a VM using metadata.

Like reference numbers and designations in the various drawings indicate like elements.

DETAILED DESCRIPTION

Figure 1:
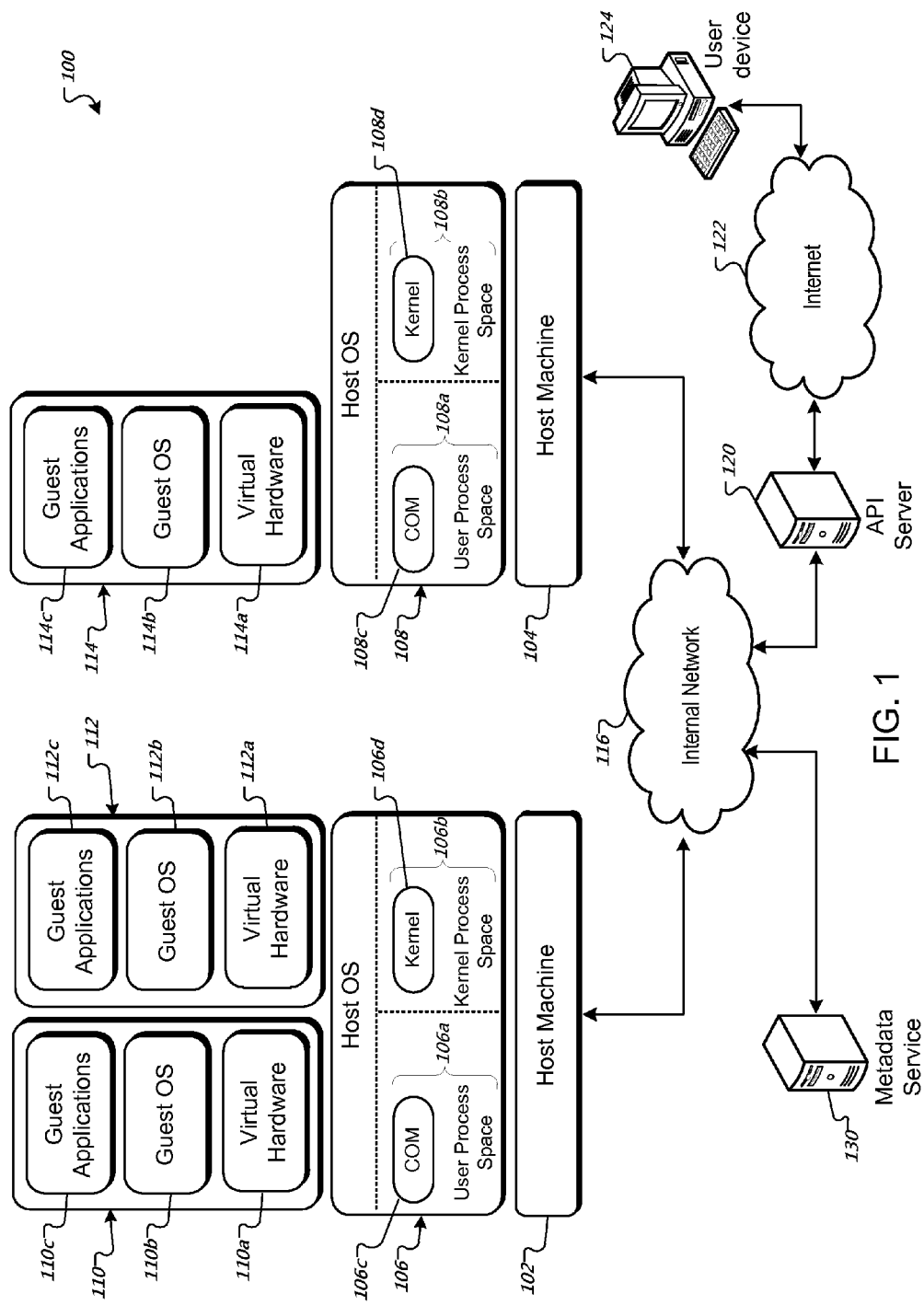
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network can include one or more wired, e.g., Ethernet, or wireless, e.g., WI-FI, networks, for example. In some implementations the internal network 116 is an intranet. Host machines can also communicate with devices on external networks, such as the Internet 122, through one or more gateways which are data processing apparatus responsible for routing data communication traffic between the internal network 116 and the external network 122. Other types of external networks are possible.

Each host machine 102, 104, executes a host operating system 106, 108. A host operating system 106, 108, manages host machine resources. In this example, host operating systems 106, 108, run software, e.g. a virtual machine monitor ("VMM") or a hypervisor, that virtualizes the underlying host machine hardware and manages concurrent execution of one or more virtual machines ("VMs"). In this example, the host operating system 106 manages two VMs, VM 110 and VM 112, while a different host operating system 108 manages a single VM 114. VMs can be migrated from one host machine to another host machine. In addition, a single VM can be managed by multiple host machines. A host machine can, in general, manage multiple virtual machines, however, the quantity may be limited based on physical resources of the host machine.

Each VM provides an emulation of a physical hardware system which may, but need not, be based on the host machine hardware architecture. The simulated version of the hardware is referred to as virtual hardware, e.g., virtual hardware 110a, 112a, and 114a. Software that is executed by the virtual hardware is referred to as guest software. In some implementations, guest software cannot determine if it is being executed by virtual hardware or by a physical host machine. If guest software executing in a VM, or the VM itself, is compromised, malfunctions, or aborts, other VMs executing on the host machine may not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM, e.g., VMs 110, 112, and 114, is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible. The VM IP addresses are visible on the internal network 116 and, in some implementations, are visible on the Internet 122 if the addresses are advertised using a suitable routing protocol, for instance.

A VM's guest software can include a guest operating system, e.g., guest operating systems 110b, 112b, and 114b, which is software that controls the execution of respective guest software applications, e.g., guest applications 110c, 112c, and 114c, within the VM and provides services to those applications. For example, a guest operating system could be a version of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges, sometimes referred to as "supervisor mode"; that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process, e.g., communication process 106c. In some implementations, the communication process executes in the user process space, e.g., user process space 106a, of a host operating system, e.g., host operating system 106. In other implementations, the communication process can execute in the kernel process space, e.g., kernel process space 106d of the host operating system. In yet further implementations, some portion of the communication process executes in the user process space and another portion executes in the kernel process space.

The system 100 includes an API server 120 that provides control and connectivity between users and VMs in the system 100. For example, the API server 120 can receive commands from user device 124 over the Internet 122, e.g. to start a VM in the system 100.

The system 100 includes a metadata service 130 that manages and provides access to metadata for VMs in the system 100. VMs in the system 100 can read their metadata from the metadata service 130 and can also write their metadata to the metadata service 130. For example, a VM in the system can read from the metadata service 130 the name of the host machine on which it is running Metadata can be written to and read from the metadata service 130 using any appropriate network communications protocol. In some implementations, the read and write commands are implemented using conventional hypertext transfer protocol (HTTP) "GET" and "PUT" commands.

Generally, VMs read and write their own metadata using the metadata service 130. However, a VM may also read metadata of other VMs and write metadata to be read by other VMs as well. A VM can query the metadata service 130 for its own metadata by specifying a unique VM identifier for the VM. The metadata service 130 can also identify a VM by the network address of the VM making the request.

The metadata service 230 can also store metadata for groups of VMs. For example, VMs can be grouped into a "project" with a project identifier. The metadata service 130 can receive and store metadata about the project, e.g. a project description, a number of VMs in the project, a list of VMs in the project, in addition to other types of metadata. VMs grouped into a project can also be assigned metadata that is common to all VMs in the project. For example, each VM in a particular project may store metadata that describes a VMs role, e.g. "front-end server."

VMs in the same project can use the metadata service 130 to read status information of other VMs in the project. For example, a VM can query the metadata service 130 to read status information for all VMs in the project. A VM can also write its own status to the metadata service 130 for access by other VMs in the project. Thus, VMs can use the metadata service as a way to share state information with other VMs in the system 100.

The metadata service 130 can be implemented as one or more computer programs installed on one or more computers in system 100. The metadata service 130 can, for example, be installed on a particular host machine. The metadata service 130 can also run on a VM instance in the system 100. Generally, the metadata service 130 will be located in the same datacenter as VMs that it services, although the metadata service can also be located elsewhere, for example, accessible over the Internet.

Figure 2:
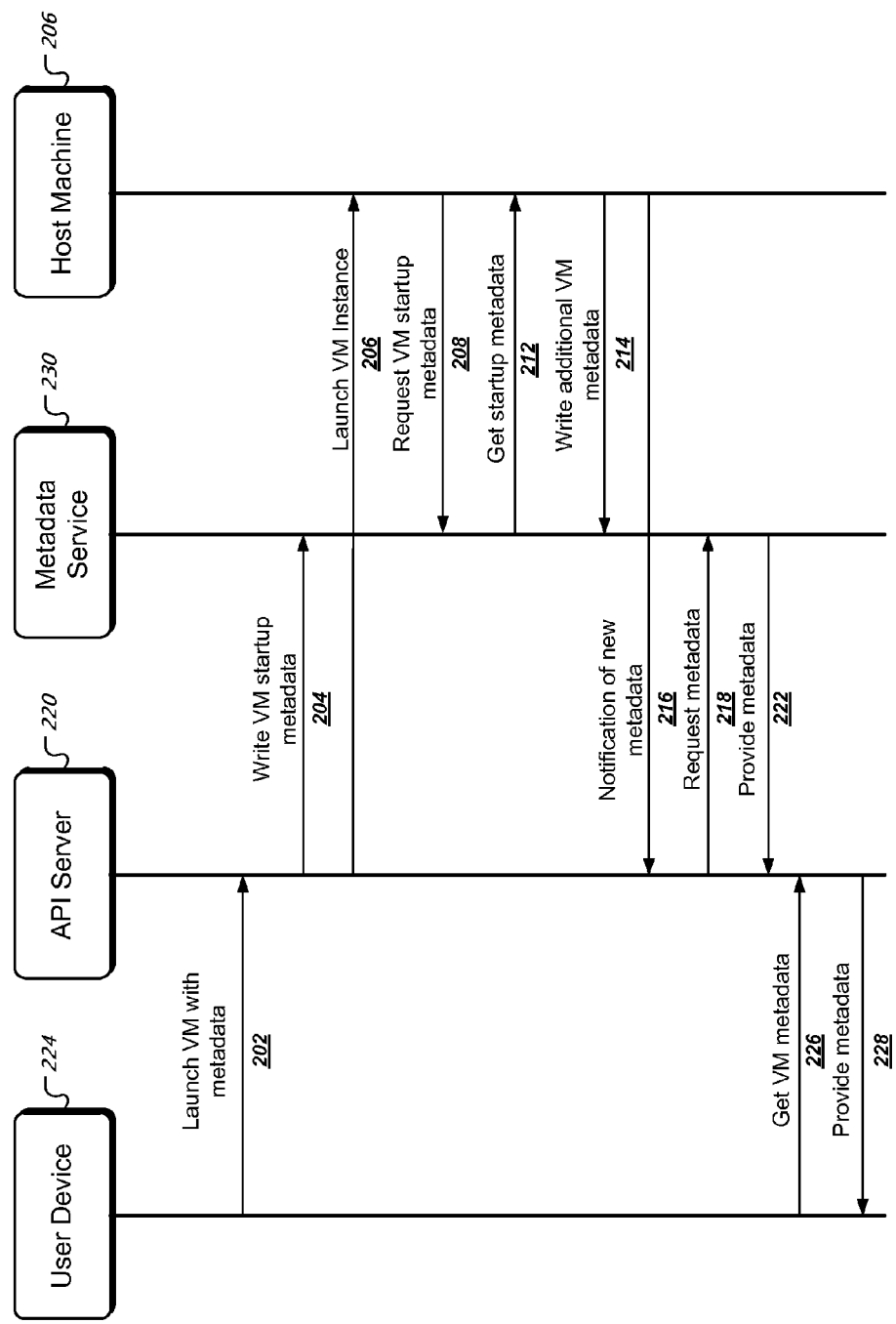
FIG. 2 is a sequence diagram of using a metadata service to store VM metadata.

FIG. 2 is a sequence diagram of using a metadata service to store and publish VM metadata. In FIG. 2, the metadata service is used to provide startup metadata for a VM, preserve the state of the VM outside the VM itself, and to publish the state of the VM for access by other entities.

A user device 224 launches a VM by specifying startup metadata (202). Generally, starting a VM on a particular host machine includes specifying a VM image and VM initialization metadata. The VM image can include device drivers, application executables, kernel binaries, file system specifications, in addition to a variety of other files required to start a VM instance.

The VM metadata can include any attributes of a particular VM instance started from the VM image. Each element of metadata is a key-value pair. The key uniquely identifies a type of metadata. The value can be one or more pieces of data, for example, text strings.

Some examples of common VM metadata include a list of ephemeral and persistent disks associated with the VM, a VM description, a host machine domain, a geographic location of the VM, a VM configuration image name, a VM identifier, a VM type, a host machine type, a user identifier, tags associated with the VM, and Secure Shell (SSH) keys for communicating with the VM.

When a VM instance is starting, users can customize a VM by providing the VM with one or more elements of initialization metadata. The initialization metadata may also include startup scripts that specify packages to install and code to download or execute upon starting.

The API server 220 accepts the request to start the VM and writes the VM startup metadata to the metadata service 230 (204). Writing the VM startup metadata to the metadata service 230, the newly started VM can access the metadata to configure itself.

The API server 220 launches a VM instance (206). The API server can for example, pass the VM image to a VMM running on host machine 206. The VMM can then use the specified VM image to launch a VM instance on the host machine 206.

The host machine 206 requests VM startup metadata from the metadata service 230 (208). Although some of the VM startup metadata can be specified in the VM image itself, the host machine 206 can also read the startup metadata that was written to the metadata service 230 through the API server 220.

The host machine 206 receives startup metadata (212). After receiving the startup metadata, the host machine can fully initialize a VM instance running on host machine 206.

The VM writes additional metadata to the metadata service 230 (214). In addition to user-specified initialization metadata, a VM itself may also generate metadata while it is running. For example, once a VM is fully booted, a startup script running on the VM can write metadata to the metadata service indicating that the VM has successfully started up. Without writing such metadata, it may be difficult for a user to determine the startup state of the VM. As another example, a VM instance may generate an SSH key to be used while other entities are communicating with the VM. The SSH key may generated after the VM has been running for some period of time.

VMs can generally write arbitrary key-value pairs to the metadata service 130, although some special key names may be reserved or require specially-formatted data. The system 100 can define default values for some VM metadata elements. The default values can be overwritten by subsequent writes to the metadata service 130. However, some metadata key-value pairs may be read-only, which prevents subsequent overwrites.

The metadata service 230 can be used to persist VM metadata, for example, when a VM is migrated from one host machine to another. Thus, a VM can preserve its current state by writing metadata to the metadata service 130. In this context, metadata preserving the "state" of a VM can include metadata values sufficient to restart the VM on another host machine, including application-specific values for applications running within the VM. Thus, what metadata is sufficient to preserving the state of a VM depend on the particular task or VM implementation.

A VM can intermittently write metadata to the metadata service 230 to preserve its state from time to time. When the VM needs to be restarted on another host machine, the metadata written to the metadata service 230 can be obtained to restore the state of the VM on a second host machine.

Guest applications running on a VM, e.g. guest applications 106c, can also be programmed to write their metadata to the metadata service 230 as a way of preserving state. Then, if a particular VM is migrated to a different host machine or rebooted, the VM can read application metadata stored in the metadata service to resume applications that were previously running on the VM.

The host machine 206 notifies the API server 220 that new metadata has been written to the metadata service 230 (216). For example, when a VM writes metadata to the metadata service 230, the VMM hosting the VM can notify the API server that new metadata is available. Thus, the API server can be notified about new metadata published by the VM without intermittently querying the metadata service or the VM instance. In some implementations, the notification rate can be capped or buffered to avoid overloading the API server or abuse.

The API server 220 requests metadata from the metadata service 230 (218). The API server can maintain a partial or complete set of metadata for a particular VM for serving to other entities, which may be user devices outside a datacenter hosting the VM, e.g. user device 224, or other VMs in the same datacenter. In response to the request, the metadata service 230 provides the requested metadata (222).

The user device 224 requests VM metadata from the API server 220 (226). The request for VM metadata can be part of a request for information about the specific VM generally, or as part of a request for information about a group of VMs.

In response to the request, the API server 220 provides the requested metadata to the user device 224 (228). Because the API server is notified by the VMM on host machine 206 when the VM generates new metadata, the API server can maintain a set of the most-recent metadata for access by the user device 224. For example, metadata reflecting the startup state of the VM can be provided to the user device 224, thus informing a user that the VM has successfully booted.

Figure 3:
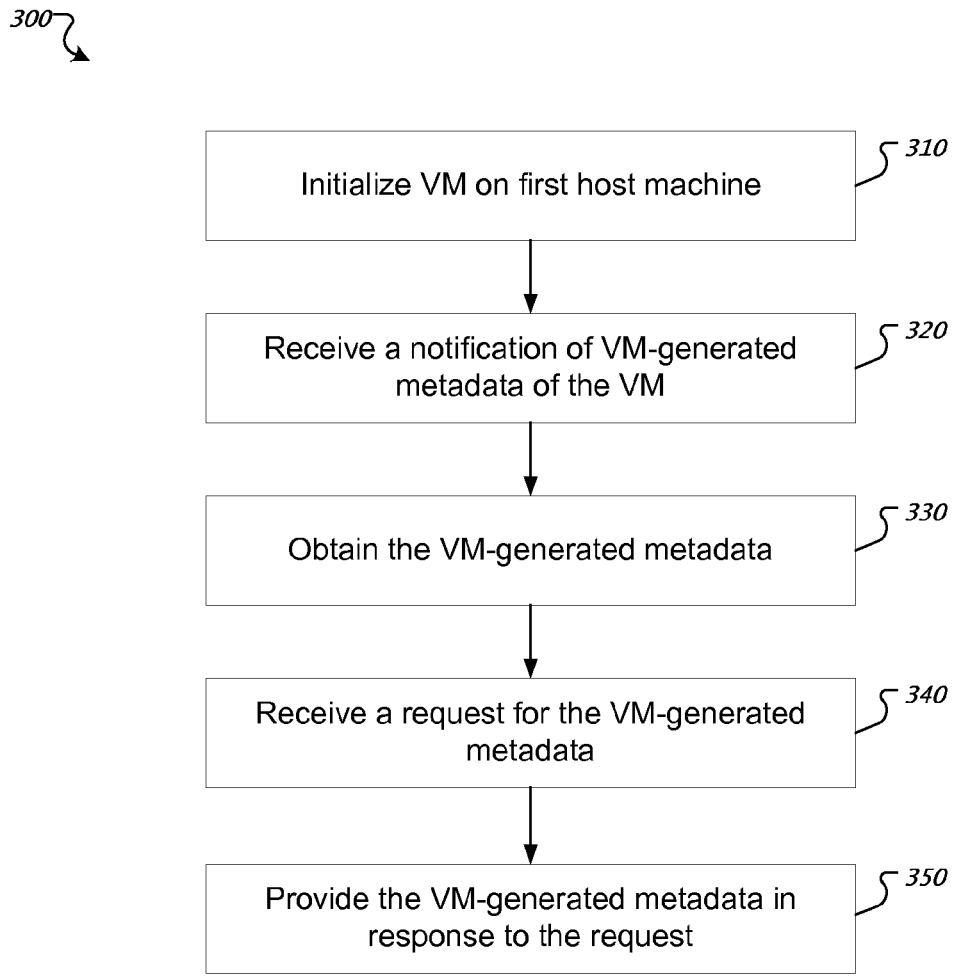
FIG. 3 is a flow chart of an example process for obtaining VM metadata.

FIG. 3 is a flow chart of an example process 300 for obtaining VM metadata. In general, a first VM writes metadata to a metadata service. The metadata stored by the metadata service can then be used to provide metadata to other entities or to resume the first VM on a second host machine. The process 300 can be performed by an API server, e.g. the API server 120 as shown in FIG. 1. For convenience, the process 300 will be described as being performed by an appropriately programmed system of one or more computers.

The system initializes a VM on a first host machine using user-specified metadata (210). As described above, a VM can be started and configured using a VM image and initialization metadata, which can be provided through a startup script or can be provided manually by a user.

The system receives a notification of VM-generated metadata from the VM (220). After the VM has started, the VM can communicate with a metadata service to provide arbitrary key-value pairs of metadata. The VM-generated metadata can also represent the state of the VM or of applications running within the VM. As described above, the notification can be received from a VMM hosting the VM. The notification can also be received from the metadata service.

The system obtains the VM-generated metadata (330). Upon receiving a notification of new VM metadata, the system can obtain an up-to-date view of the VM metadata.

The system receives a request for the one or more elements of VM-generated metadata (340). For example, the system can receive a request over the Internet from a user device of a user that started the VM. The user device can be external to a datacenter hosting the VM. The system can also receive the request from entities within the same datacenter. For example, the system can receive a request for the up-to-date VM metadata from other VMs in the datacenter.

The system provides one or more elements of VM-generated metadata in response to the request (350). The system can thus provide a view of the metadata and state of the VM without interrupting operation of or querying the VM itself.

In some implementations, the elements of VM-generated metadata are partitioned into groups that are only accessible by particular entities. For example, some elements of VM metadata may be readable by only a single VM, only a group of VMs in a particular role, or may be globally readable. The system can thus determine whether to provide the VM metadata based on the entity making the request.

FIG. 4 is a flow chart of an example process 400 for restarting a VM using metadata. In general, a first VM writes its metadata to a metadata service. The metadata stored by the metadata service can then be used to resume the first VM on a second host machine. For convenience, the process 400 will be described as being performed by an appropriately programmed system of one or more computers.

The system initializes a first VM on a first host machine using user specified metadata (410). As described above, a VM can be configured using initialization metadata provided through a custom VM image, a startup script, or provided manually by a user.

The system receives VM generated metadata from the first VM (420). After the VM has started, the VM can communicate with a metadata service to provide arbitrary key value pairs of metadata. Applications running on the VM can also provide application specific metadata to the metadata service.

The system receives an indication that the first VM has failed (430). A user or a datacenter management system can receive an indication that the first VM has failed, e.g. due to a time out or failure to respond, a received error message, or a host machine failure. In some implementations, other VMs grouped in a project can read metadata from the metadata service about a particular VM and can determine that the VM has failed and needs to be rebooted. For example, if a VM reaches a particular error condition, the VM can write metadata to the metadata service indicating that the VM has effectively failed and should be rebooted.

The system initializes a second VM on a second host machine (440). In response to the VM failure, a datacenter management system can automatically reboot the VM on the same or a different host machine. A user can also manually reboot the VM on the same or a different host machine.

To restart the VM on a different host machine, the VM can be configured with the same initialization metadata used to start the VM on the first host machine, e.g. initialization metadata provided by the VM image or through startup scripts.

The system configures the second VM with VM-generated metadata from a metadata service (450). In addition to the user-specified initialization metadata, the VM is also configured with VM-generated metadata that had been provided to the metadata service while the VM was running on the first host machine.

Thus, a VM can effectively be migrated to and resumed on the second host machine using metadata provided to the metadata service while the VM was running on the first host machine. A VM can effectively persist its state on a restarted VM by intermittently providing VM-specific to the metadata service while running. This ensures that the state of the VM and applications running on the VM are preserved by the metadata service.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed on one or more computers, the method comprising:
   initializing a first virtual machine (VM) on a first host machine using one or more elements of user-specified initialization metadata;
   receiving a notification that the first VM has published one or more elements of new VM-generated metadata to a metadata service;
   in response to receiving the notification, requesting the one or more elements of new VM-generated metadata from the metadata service;
   receiving the one or more elements of new VM-generated metadata from the metadata service;
   receiving a request for one or more elements of VM-generated metadata; and
   providing the one or more elements of new VM-generated metadata in response to the request.

2. The method of claim 1, wherein receiving the request for the one or more elements of VM-generated metadata comprises receiving the request from a user-device external to a datacenter hosting the first VM.

3. The method of claim 1, wherein receiving the request for the one or more elements of VM-generated metadata comprises receiving the request from a second VM hosted in a datacenter hosting the first VM.

4. The method of claim 1, further comprising:
   receiving an indication that the first VM has failed;
   initializing a second VM on a different second host machine; and
   configuring the second VM using the one or more elements of new VM-generated metadata.

5. The method of claim 4, wherein initializing a second VM on a different second host machine comprises resuming a state of the first VM in the second VM according to the one or more elements of new VM-generated metadata.

6. The method of claim 5, wherein configuring the second VM using the one or more elements of new VM-generated metadata comprises:
   starting an application on the second VM; and
   restoring a state of the application to a previous state using the one or more elements of new VM-generated metadata.

7. The method of claim 1, further comprising overwriting one or more elements of the user-specified initialization metadata with the one or more elements of new VM-generated metadata.

8. The method of claim 1, wherein the VM-generated metadata stored by the metadata service represents a state of the first VM.

9. The method of claim 1, wherein the one or more elements of new VM-generated metadata comprises one or more attributes of an application running within the first VM.

10. The method of claim 1, wherein the first VM intermittently publishes one or more elements of new VM-generated metadata to the metadata service.

11. A system comprising:
    one or more computers and one or more storage devices storing instructions that are operable, when executed by the one or more computers, to cause the one or more computers to perform operations comprising:
    initializing a first virtual machine (VM) on a first host machine using one or more elements of user-specified initialization metadata;
    receiving a notification that the first VM has published one or more elements of new VM-generated metadata to a metadata service;
    in response to receiving the notification, requesting the one or more elements of new VM-generated metadata from the metadata service;
    receiving the one or more elements of new VM-generated metadata from the metadata service;
    receiving a request for one or more elements of VM-generated metadata; and
    providing the one or more elements of new VM-generated metadata in response to the request.

12. The system of claim 11, wherein receiving the request for the one or more elements of VM-generated metadata comprises receiving the request from a user-device external to a datacenter hosting the first VM.

13. The system of claim 11, wherein receiving the request for the one or more elements of VM-generated metadata comprises receiving the request from a second VM hosted in a datacenter hosting the first VM.

14. The system of claim 11, wherein the operations further comprise:
receiving an indication that the first VM has failed;
initializing a second VM on a different second host machine; and
configuring the second VM using the one or more elements of new VM-generated metadata.

15. The system of claim 14, wherein initializing a second VM on a different second host machine comprises resuming a state of the first VM in the second VM according to the one or more elements of new VM-generated metadata.

16. The system of claim 15, wherein configuring the second VM using the one or more elements of VM-generated metadata comprises:
starting an application on the second VM; and
restoring a state of the application to a previous state using the one or more elements of new VM-generated metadata.

17. The system of claim 11, wherein the operations further comprise overwriting one or more elements of the user-specified initialization metadata with the one or more elements of new VM-generated metadata.

18. The system of claim 11, wherein the VM-generated metadata stored by the metadata service represents a state of the first VM.

19. The system of claim 11, wherein the one or more elements of new VM-generated metadata comprises one or more attributes of an application running within the first VM.

20. The system of claim 11, wherein the first VM intermittently publishes one or more elements of new VM-generated metadata to the metadata service.

21. A computer program product, encoded on one or more non-transitory computer storage media, comprising instructions that when executed by one or more computers cause the one or more computers to perform operations comprising:
initializing a first virtual machine (VM) on a first host machine using one or more elements of user-specified initialization metadata;
receiving a notification that the first VM has published one or more elements of new VM-generated metadata to a metadata service;
in response to receiving the notification, requesting the one or more elements of new VM-generated metadata from the metadata service;
receiving the one or more elements of new VM-generated metadata from the metadata service;
receiving a request for one or more elements of VM-generated metadata; and
providing the one or more elements of new VM-generated metadata in response to the request.

22. The computer program product of claim 21, wherein receiving the request for the one or more elements of VM-generated metadata comprises receiving the request from a user-device external to a datacenter hosting the first VM.

23. The computer program product of claim 21, wherein receiving the request for the one or more elements of VM-generated metadata comprises receiving the request from a second VM hosted in a datacenter hosting the first VM.

24. The computer program product of claim 21, wherein the operations further comprise:
receiving an indication that the first VM has failed;
initializing a second VM on a different second host machine; and
configuring the second VM using the one or more elements of new VM-generated metadata.

25. The computer program product of claim 24, wherein initializing a second VM on a different second host machine comprises resuming a state of the first VM in the second VM according to the one or more elements of new VM-generated metadata.

26. The computer program product of claim 25, wherein configuring the second VM using the one or more elements of VM-generated metadata comprises:
starting an application on the second VM; and
restoring a state of the application to a previous state using the one or more elements of new VM-generated metadata.

27. The computer program product of claim 21, wherein the operations further comprise overwriting one or more elements of the user-specified initialization metadata with the one or more elements of new VM-generated metadata.

28. The computer program product of claim 21, wherein the VM-generated metadata stored by the metadata service represents a state of the first VM.

29. The computer program product of claim 21, wherein the one or more elements of new VM-generated metadata comprises one or more attributes of an application running within the first VM.

30. The computer program product of claim 21, wherein the first VM intermittently publishes one or more elements of new VM-generated metadata to the metadata service.

* * * * *